United States Patent
Mei et al.

(10) Patent No.: US 6,894,089 B2
(45) Date of Patent: May 17, 2005

(54) MODIFIED SILANE TREATED PIGMENTS OR FILLERS AND COMPOSITIONS CONTAINING THE SAME

(75) Inventors: Henry L. Mei, New City, NY (US); Louis M. Panzer, Ridgefield, CT (US); Eric R. Pohl, Mount Kisco, NY (US); Robert E. Christie, North Salem, NY (US); Philbert E. Ramdatt, New York, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/658,576

(22) Filed: Sep. 9, 2003

(65) Prior Publication Data

US 2004/0048952 A1 Mar. 11, 2004

Related U.S. Application Data

(62) Division of application No. 09/843,603, filed on Apr. 26, 2001, now abandoned.

(51) Int. Cl.$^7$ .............................. C08K 9/06; C08K 3/22
(52) U.S. Cl. ...................... 523/212; 523/231; 524/431; 524/837
(58) Field of Search ................................ 523/212, 213; 524/431, 847

(56) References Cited

U.S. PATENT DOCUMENTS

| | | | |
|---|---|---|---|
| 3,689,300 A | 9/1972 | Bunger et al. | 106/287 |
| 4,061,503 A | 12/1977 | Berger et al. | 106/300 |
| 4,151,154 A | 4/1979 | Berger | 260/40 |
| 4,740,538 A | 4/1988 | Sekutowski | 523/205 |
| 4,810,305 A | 3/1989 | Braun et al. | 106/499 |
| 5,411,761 A | 5/1995 | Inokuchi et al. | 427/220 |
| 5,552,458 A | 9/1996 | Hall et al. | 523/403 |
| 5,607,994 A | 3/1997 | Tooley et al. | 524/265 |
| 5,631,310 A | 5/1997 | Tooley et al. | 523/212 |
| 5,853,809 A | 12/1998 | Campbell et al. | 427/407.1 |
| 6,096,829 A | 8/2000 | Chino et al. | 529/99 |
| 6,635,700 B2 * | 10/2003 | Cruse et al. | 524/262 |

FOREIGN PATENT DOCUMENTS

| | | |
|---|---|---|
| EP | 0265223 | 4/1988 |
| EP | 0870731 | 10/1998 |
| JP | 406200101 A * | 7/1994 |

* cited by examiner

Primary Examiner—Tae H. Yoon

(57) ABSTRACT

The present invention is directed to a composition comprising a white pigment or extended white pigment surface treated with a silane having at least one functional group capable of reacting with acids and anhydrides, at least one polymeric material and a compatibilizer. Once treated, the pigment has improved processability and dispersibility in polymeric materials. Silanizing the pigment also enhances the brightness (increase whiteness and reduce yellowness) of the pigment.

27 Claims, No Drawings

MODIFIED SILANE TREATED PIGMENTS OR FILLERS AND COMPOSITIONS CONTAINING THE SAME

This application is a divisional of U.S. application Ser. No. 09/843,603, filed on Apr. 26, 2001 now abandoned.

FIELD OF THE INVENTION

The present invention relates to the surface treatment of pigments, particularly white pigments, to improve dispersibility in polymeric materials, processability, and performance characteristics of the pigments. The pigments are treated with an organosilicon compound having at least one functional group that is capable of reacting with an acid or an anhydride. More specifically, the present invention relates to polymeric compositions comprising the surface treated pigments of the present invention.

BACKGROUND OF THE INVENTION

The treatment of titanium dioxide pigments with organosilicon compounds to improve dispersibility in a polymer matrix is well known in the art. For instance, U.S. Pat. No. 4,061,503 to Berger et al. and U.S. Pat. No. 4,151,154 to Berger describe the treatment of particulate titanium dioxide to improve its dispersibility in a resin or plastic medium. The titanium dioxide contains on its surface a silane possessing at least two to about three hydrolyzable groups bonded to the silicon, and an organic group which contains a polyalkylene oxide group.

Further, U.S. Pat. No. 4,810,305 to Braun et al. discloses a modified hydrophobic pigment or filler containing 0.05 to 10 wt. % of an organopolysiloxane having improved dispersibility in synthetic resins. U.S. Pat. Nos. 5,607,994 and 5,631,310, both to Tooley et al., disclose white-pigmented polymers (particularly, polyolefins such as polyethylene) containing white pigments treated with at least one silane or a mixture of at least one silane and at least one polysiloxane to improve processability in compounding and to improve performance properties such as lacing resistance in a polymeric matrix, as well as other physical characteristics.

SUMMARY OF THE INVENTION

The present invention relates to a pigment surface treated with a silane having at least one functional group capable of reacting with acids and anhydrides. The surface treated pigment or extended white pigment can then be compounded with at least one polymeric material and at least one compatibilizer.

The silane of the present invention useful for surface treating the pigments or extended white pigments has the following general structure:

wherein

R is a nonhydrolyzable functional group directly or indirectly bonded to the silicon atom such as epoxy, isocyanato, mercapto, and mixtures thereof;

R' is a hydrolyzable group such as alkoxy, halogen, acetoxy or hydroxy or mixtures thereof; and x is 1 to 3.

Preferably, the pigment or extended white pigment is titanium dioxide.

The compatibilizer has at least one group which is acidic, or is an anhydride thereof.

The resultant polymer composition may further comprise lubricants, as well as a variety of other conventional additives.

The silanized pigments of the present invention exhibit improved processability, lower viscosity, increased lacing resistance, improved dispersion in polymeric materials and excellent optical properties including improved whiteness and yellowness index over the untreated pigments. The polymeric compositions of the present invention may be used in an endless variety of articles and applications.

DETAILED DESCRIPTION OF THE PREFERRED EMBODIMENT

In general, the present invention encompasses the whitening treatment of potentially any inorganic oxide particulate material, clays, pigments, extended white pigments, and so forth. These materials are typically from classes of materials referred to as fillers, pigments, and reinforcing materials such as inorganic particulate materials and fibers (such as glass fibers, aluminum fibers and steel fibers), and so forth. Such materials include aluminum trihydroxide, magnesium hydroxide, calcined clays, kaolin clays, nanoclays, brass (with an oxidized surface), copper metal (oxidized at its surface), aluminum metal (oxidized at its surface), iron or steel (oxidized at its surface), alumina, aluminum trihydrate, siliceous materials such as fumed silica, hydrated silica (precipitated silica), silica aerogels, silica xerogels, aluminum silicates, calcium magnesium silicate, asbestos, glass fibers, molecular sieves, Wallostonite, calcium carbonate, carbon black (including lamp black), titanium dioxide (including titanium dioxide which contains HCl soluble alumina and/or silica), calcium sulphate, magnesium sulfate, calcium carbonate containing a silica coating or agglomerated to silica, and the like. In particular, the present invention is especially useful for the surface treatment of white pigments or extended white pigments, and even more particularly for the surface treatment of titanium dioxide pigments.

The titanium dioxide, $TiO_2$, pigments useful in the present invention generally are in the rutile or anatase crystalline form and are commonly made by either a chloride process or a sulfate process. The optimum average particle size can range from about 0.005 to about 1 micron. The $TiO_2$ pigments may also contain ingredients added thereto to further improve dispersibility characteristics or other properties such as durability.

It has been found that the silane treatment of this invention can be used not only for $TiO_2$ but also for so-called extended white pigments such as calcium carbonate.

Additives and/or inorganic oxides are commonly added to the pigments and include but are not limited to aluminum, silicon, tin, triethanolamine, trimethylolpropane, phosphates, and so forth. Such additives are known to one of skill in the art.

"Silanized $TiO_2$" is defined herein as $TiO_2$ treated with either at least one silane, or a mixture of at least one silane and at least one polysiloxane (collectively referred to herein as organosilicon compounds).

The silanes useful herein are those that have a functional group capable of reacting with anhydrides or acids, their hydrolyzates or condensates thereof. Examples of such silanes include those having epoxy, isocyanato, and mercapto groups. In preferred embodiments, the silanes have epoxy groups.

Suitable silanes have the following general formula:

wherein

R is a nonhydrolyzable functional group directly or indirectly bonded to the silicon atom;

R' is a hydrolyzable group such as alkoxy, halogen, acetoxy, hydroxy or mixtures thereof; and x=1 to 3.

Examples of suitable silanes useful in carrying out the invention include but are not limited to γ-(3,4-epoxycyclohexyl)ethyltrimethoxysilane such as Silquest® A-186, γ-glycidoxypropyltrimethoxysilane such as Silquest® A-187, γ-Glycidoxypropylmethyldiethoxysilane such as Silquest® Y-15078, 2-(3,4-epoxycyclohexalethyltriethoxysilane such as Silquest® Y-11870), γ-isocyanatopropyltrimethoxysilane such as Silquest® A-1310, γ-mercaptopropyltrimethoxysilane such as Silquest® A-189, and so forth. All of the above mentioned Silquest® materials are available from Crompton Corporation of Greenwich, Conn. Preferably, the silanes utilized include Silquest® A-187, Silquest® Y-11870and Silquest® Y-15078.

The silanes of the present invention may be used in combination with a lubricant including, but not limited to, polysiloxanes, silicone fluids, stearates, paraffin oils, fluorocarbon lubricants, and so forth. The polysiloxanes useful herein include polydimethylsiloxane and organomodified polydimethylsiloxane. "Organomodified" refers to organic pendant groups on the molecules that may include polyalkylene oxides such as polyethylene oxide, polyether groups, vinylic groups, and so forth.

In one embodiment, a mixture of at least one silane with at least one polysiloxane is advantageous in carrying out the invention. Suitable polysiloxanes for use in combination with at least one silane have the following general formula:

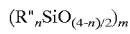

$(R''_n SiO_{(4-n)/2})_m$ wherein

R" is an organic or an inorganic group;

n is 0 to 3; and m is equal to or greater than 2.

Examples of useful polysiloxanes in carrying out the present invention include, but are not limited to, polydimethylsiloxane (PDMS), vinyl phenylmethyl terminated dimethyl siloxanes, divinylmethyl terminated PDMS and the like, PDMS with polyether pendant groups including Silwet® PA-1 available from Crompton Corporation. PDMS such as Silwet® L-45, available from Crompton Corporation, is an example of a particularly useful polysiloxane.

The silanes preferable for use in combination with the polysiloxanes include those silanes described above such as 2-(3,4-epoxycyclohexaethyl triethoxy silane such as Silquest® Y-11870, and γ-glycidoxypropyltrimethoxy silane such as Silquest® A-187. The silane/polysiloxane mixture is useful from about 0.1 wt. % to about 5.0 wt. %, and preferably from about 1.0 wt. % to about 3.0 wt. %, based on a total weight of the silanized pigments. A preferred combination is about 0.5 wt. % to about 1.5 wt. % of the silane(s), and about 0.5 wt. % to about 1.5 wt. % of the polydimethylsiloxane based on a total weight of the silanized pigments. The ratio of silane(s) to polysiloxane may be from about 1:2 to about 2:1, with the preferred ratio being about 1:1.

In preparing the silanized pigment, the order of addition is not especially critical and the pigment may be treated with the silane using a number of different methods. For example, the silane can be either added neat or in a prehydrolyzed form to a dry pigmentary base, or it can be added into a slurry. The silane can be added during filtration, during drying, at a sizing operation such as a fluid energy mill, e.g. micronizer, or at a media mill. The silane may also be post blended after micronizing. One of skill in the art would be knowledgeable in treating the pigmentary base with the silane(s). For instance, media milling first involves reducing the viscosity of a high solids $TiO_2$ pigment slurry by adjusting the pH in the range of about 7.5 to about 11 with caustic or the like, or by contacting the slurry with a reducent, and then treating the slurry with an organosilicon reagent. The treating step is either preceded by and/or followed by media milling the high solids slurry to reduce the $TiO_2$ particle size. The slurry is then dried as a product thereby eliminating the post drying manipulation to control pigment properties such as particle size distribution.

The surface modification of pigments by may also be effectuated by adding amino organosilane to a pigment dispersion directly in a suitable solids mixing apparatus. Postblending processes may also be employed as well.

The description of the various preparation methods described herein is intended for guidance purposes only, and is in no way intended as a limitation on the scope of the present invention. One of skill in the art would realize that there are various methods and modifications of such methods which may be utilized to prepare the silanized pigments or fillers of the present invention. Such methods and modifications are seen to be within the scope of the present invention.

The polysiloxane addition may be made in conjunction with the silane, or added to the already silanized pigment. The silane addition and polysiloxane addition is described in greater detail below.

If water, either liquid or vapor (steam), is present as a component of the process stream, hydrolysis of the hydrolyzable groups of the silane will occur and the silane coating will bond to the $TiO_2$ base. Pre-hydrolyzing the silane is a preferred step in treating the $TiO_2$ pigment with the silane. Hydrolysis of silanes is described in greater detail in "*Organofunctional Silanes*" by Union Carbide (1991).

The treated pigment compositions of the present invention may further comprise a compatibilizer. The compatibilizer comprises at least one reactive group capable of reacting with the functional groups of the organosilicone compound. If, however, the polymeric material itself comprises such a functional group, a compatibilizer may not be utilized. For instance, if a modified polyolefin polymer with such a functional group is used, a compatibilizer may be superfluous. In the alternative, a compatibilizing compound may be added in addition to the polymeric material being utilized. In the case of a polymeric composition wherein the polymeric material is an unmodified polyolefin without any reactive groups, then a compatibilizer is additionally added to the composition.

Examples of useful compatibilizers include copolymers of ethylene or propylene with anhydride or acid groups capable of reacting with the functional groups of the organosilicon compound such as an epoxy group. The copolymers useful herein include ethylene maleic anhydride copolymers (EMAH), ethylene acrylic acid copolymers (EAA), ethylene methacrylic acid copolymers (EMAA), propylene maleic anhydride copolymers (PMAH), propylene acrylic acid copolymers (PAA), ethylene propylene copolymers with maleic anhydride or acid functional groups (EPMAH or EPAA), olefinic ionomer resins such as ethylene ionomers, and so forth. Ethylene maleic anhydride copolymers (EMAH) and ethylene-acrylic acid copolymers (EAA) are preferred.

Some specific examples of useful compatibilizers include ACX® ethylene-maleic anhydride copolymer resins from Allied Signal Corporation of Morristown, N.J., Primacor® ethylene-acrylic acid copolymer resins from The Dow Chemical Company of Midland, Mich., Surlyn® ionomer resins available from E.I. du Pont de Nemours and Company of Wilmington, Del., and Nucrel® ethylene methacrylic acid (EMAA) copolymers also available from E.I. du Pont de Nemours and Company. The compatibilizer is present in an amount from about 0.5 wt. % to about 20 wt. %, preferably from about 1.0 wt. % to about 10 wt. %, more preferably from about 1.0 wt. % to about 6.0 wt. %, and most preferably from about 3.0 wt. % to about 5.0 wt. % based on a total weight of the mixture which include the treated $TiO_2$, polymer, compatibilizer, and any other components used in the mixture.

The silanized compounds of the present invention may be used in combination with any polymeric material with which such compounds are typically used. The silane acts, in a sense, as a dispersion promoter, by increasing the compatibility or dispersibility of the inorganic oxide or other particulate material within the plastic or resin system in which it is supplied.

The polymers useful herein are known to those of skill in the art. The general classes of polymers suitable for use herein are thermoplastic or thermosetting polymeric resinous materials, and include but are not limited to, the olefinic polymers including polyethylene and its copolymers and terpolymers, polybutylene and its copolymers and terpolymers, polypropylene and its copolymers and terpolymers; alphaolefins including linear or substantially linear interpolymers of ethylene and at least one α-olefin and atactic polyalphaolefins; rubbery block copolymers; polyamides; polyesters such as polyethyleneterephthalate and polybutyleneterephthalate; vinylic polymers; acrylics; epoxies; polycarbonates; and so forth; and mixtures thereof. Preferably, the polymers are selected from the group consisting of polyethylene, ethylene copolymers, polypropylene, propylene copolymers, and mixtures thereof.

Olefinic polymers, such as polyethylene, polypropylene and polybutylene, are from a broad class of polymers typically referred to as polymers of ethylenically unsaturated monomers, and the copolymers and terpolymers of such polymers with higher olefins such as alpha olefins containing 4 to 10 carbon atoms, or vinyl acetate, and the like.

Olefins, i.e. ethylene, are often copolymerized with vinyl monomers such as acrylates or vinyl esters of carboxylic acid compounds. Specific acrylate monomers include acrylic acid, methacrylic acid, acrylamide, methacrylamide, methyl acrylate, methyl methacrylate, methoxyethyl methacrylate, methoxyethyl acrylate, and so forth. Vinyl esters of carboxylic acids include vinyl acetate, vinyl butyrate and so forth. Commonly used polymers of this variety include, for instance, ethylene vinyl acetate, ethylene ethyl acrylate, ethylene n-butyl acrylate, and ethylene methylacrylate.

Other useful polymeric resins include vinylic compounds such as polyvinyl chloride; polyvinyl esters such as polyvinyl acetate; polystyrene, acrylic homopolymers, copolymers and terpolymers; phenolics; alkyds; amino resins; epoxy resins; polyamides; polyurethanes; phenoxy resins; polysulfones; polycarbonates; polyesters and chlorinated polyesters; polyethers; acetal resins; polyimides; polyoxyethylenes; and so forth.

Other useful polymers include various rubbers and/or elastomers including both natural and synthetic rubbers. Such polymers may be copolymerized, grafted, physically blending with various diene monomers, and so forth. Block copolymers are a commonly used elastomer and include polymers formed of styrene, butadiene, isoprene and so forth. More specifically, styrene-butadiene-styrene, styrene-isoprene-styrene, styrene-ethylene/butylene-styrene, styrene-ethylene/propylenestyrene, and so forth. Other elastomers include natural rubber, i.e. polyisoprene; polyisobutylene; butyl rubbers; and so forth.

Some polymers preferable for use in combination with the silanized compounds of the present invention include polyolefins such as polyethylene, polypropylene, polyvinyl chloride, polyamides, polyesters and copolymers and terpolymers thereof.

"High loaded" $TiO_2$ may depend on the type of polymer used and may be anywhere from about 40 wt. % $TiO_2$, up to about 90 wt. % $TiO_2$. For instance, in a polyolefin matrix, a high loaded $TiO_2$ would be about 50 wt. % or more of the $TiO_2$ pigment, based on a total weight of polyolefin matrix.

A wide variety of conventional additives may be optionally added to the polymeric compositions of the present invention as is necessary, desirable or conventional for the intended end use. Such additives include but are not limited to antioxidants, ultraviolet (UV) stabilizers, lubricants, thermal processing additives, and so forth. Such additives are known to those of skill in the art.

$TiO_2$ coated with organosilicon compounds can be incorporated with a polymer in a melted state to form the polymeric compositions of the present invention by any melt compounding technique known to those of skill in the art. Generally, $TiO_2$ and polymeric resin are added together, and are subsequently mixed in a blending apparatus that applies shear to the melted polymer. The polymeric resin is typically commercially available in a variety of forms including but not limited to powder, granules, pellets, cubes, and so forth.

In a typical mixing operation, pigment and polymer are first dry blended while the polymer is still in a solid, pre-melted state. This can be accomplished with simple processes such as by shaking in a bag or by tumbling in a closed container. More sophisticated methods include blending apparatuses having agitators or paddles. The pigment and the polymeric resin can be co-fed into mixers having an internal screw, i.e. an extruder device, which mixes the pigment and polymer prior to the polymer achieving a molten state.

Melt blending the components may be accomplished using any conventional equipment known to those of skill in the art including single-screw extruders, twin-screw extruders including the broad range twin screw extruders and corotating twin screw extruders, high shear mixers, blender type mixers, and so forth. Twin-screw extruders are commonly used. The melt blending can be accomplished during formation of an article such as during a melt extrusion process. Melt extrusion can also be combined with blow molding, for instance.

Exemplary mixers include co-rotating twin screw extruders manufactured by Werner & Pfleiderer in Ramsey, N.J., and by Leistritz Extruder Corporation in Somerville, N.J. Farrel Corporation in Ansonia, Conn. manufacturers the Farrel Continuous Mixers (FCM).

There are numerous ways of preparing the polymeric compositions of the present invention. A concentrate may first be prepared having a high concentration of $TiO_2$, commonly referred to as a masterbatch, and then subsequently combining the concentrate with polymeric resin.

The highly loaded polymer concentrates are made as described above with the desirable weight % of pigment for the intended end use. For example, in polyolefin concentrates, about 50 wt. % to 85 wt. % concentrate may be used to opacify the composition. The $TiO_2$ concentrate is "let down" into the polymer. As used herein, "let down" refers to process of lowering the $TiO_2$ concentration in a resultant polymer. For example, in optical property evaluation, a concentrate having about 50 wt. % to about 87 wt. % $TiO_2$ may be let down to about 0.2 wt. % to about 30 wt. % by dry mixing polyolefin, extruding at a specific temperature, and casting it into a film. The pigment performance is then evaluated in an end use application.

The highly loaded silanized pigmentary $TiO_2$ exhibits outstanding processibility in polyolefinic matrices, and excellent lacing resistance. The torque and pressure can be utilized to determine the relative ease with which the compositions are processed through a mixer, e.g. an extruder, for instance. The lower the torque and pressure required to mix and move the composition through the equipment, the easier the processing. Furthermore, typically, the higher the loading of pigment or filler, i.e. $TiO_2$, in a polymer concentrate, the slower the processing rates.

The compositions of the present invention require lower torque and pressure for processing, particularly through an extruder, than do those polymeric compositions compounded with untreated titanium dioxide, and faster processing rates can also be obtained. Another advantage of the polymeric films made using the pigmented compositions of the present invention, particularly those made with the silanized $TiO_2$ of the present invention, is increased lacing resistance. Other advantages include increased bulk density, lower viscosity, excellent dispersion, excellent moisture resistance, and excellent optical properties such as high whiteness and gloss.

The polymeric materials containing the treated pigments of the present invention are useful in a variety of applications. The polymeric compositions of the present invention may be employed, for example, for molding (including extrusion, injection, calendering, casting, compression, lamination, and/or transfer molding), coating (including lacquers, film bonding coatings and painting), inks, dyes, tints, impregnations, adhesives, caulks, sealants, rubber goods, and cellular products. Thus, the choice and use of the polymeric compositions with the treated particles of this invention is essentially limitless.

One of ordinary skill in the art would understand that there are a vast number of modifications which could be made without changing the scope of the invention, those modifications and embodiments thereof are contemplated to be within the scope of the present invention.

The following non-limiting examples are further illustrative of the present invention, and are in no way intended to limit the scope of the present invention.

EXAMPLES

Test Methods
1. Viscosity (Pascal/second) and Melt Flow Index (g/10 Minutes)

The viscosity and melt flow index were measured at 190° C. using a Tinius Olsen Extrusion Plastometer available from Tinius Olsen Corporation in Willow Grove, Pa.

2. Yellow Index and Whiteness

The yellowness index and whiteness were measured using the films and plaques as prepared above using a Colorgard System™ 1000 colorimeter manufactured by Pacific Scientific Corporation in Silver Spring, Md. Film thickness was about 4 mils.

3. Gloss

The gloss of the film and plaque samples was measured with a GL-4525 glossmeter manufactured by Paul N. Guard Co. in Pompano Beach, Fla. Film thickness was about 4 mils.

4. Hue and Chroma

The hue and chroma of the film and plaque samples were measured using a Minolta® CR 231 chromameter available from Minolta Corporation in Osaka, Japan. The films tested had a thickness of about 4 mils.

5. Dispersion

The dispersion of the pigment was tested using a light box. Film thickness was approximately 1 mil. The dispersion is rated according to the distribution and uniformity using a rating of excellent, good, fair and poor.

The following examples were prepared using a masterbatch concentrate prepared in the following manner. The masterbatch concentrate contained 80 wt. % $TiO_2$ in low density polyethylene (LDPE). The $TiO_2$ powder was treated with silane or a silane/siloxane combination, and mixed with low density Microthene® GMN 711-20 LDPE available from Equistar Corporation in Houston, Tex., having a melt flow index (MFI) of 22, and a compatibilizer which was an ethylene-maleic anhydride copolymer, ACX® 575 available from Allied Signal Corporation in Morristown, N.J., or Primacor® 2410, an ethylene-acrylic acid copolymer available from The Dow Chemical Company, in Midland, Mich. The composition was mixed in a Henschel dry mixer manufactured by Prodex Corporation in Fords, N.J. The dry mix was then fed into a twin screw extruder (ZSK 30 by Werner & Pfleiderer of Ramsey, N.J.) for a melt compounding. The twin screw extruder was equipped with recording equipment for recording temperature, pressure, rotating speed, torque and power consumption. The extruded rods were fed into a water bath, air knife and pelletizer. The 80 wt. % high loaded $TiO_2$/LDPE pellets were dried at 140° F. (60° C.) for about 8 hours and then made into films using a Brabender PL-V302 single extruder with a 6" wide slot die. The films were tested for dispersion of $TiO_2$ in LDPE using a light box.

The masterbatch was then let down to 8%. The balance of LDPE (Petrothene® NA206, MFI™ 13 available from Equistar Corporation), antioxidant (Irganox® B-215 and 1010, from Ciba Specialty Chemicals in Tarrytown, N.Y.) and ultraviolet stabilizer (Tinuvin® 783FP, also from Ciba Specialty Chemicals) were added into the Masterbatch pellets with a bag dry mixing. The dry mix was fed into a 2" single screw extruder (Midland Ross Hartic) for a melt compounding. The extruded strands went through a water bath and pelletizer.

The let down pellets were made into film samples using a Brabender model PL-V302 single extruder with a 6" wide slot die. The dispersion of $TiO_3$ in LDPE was checked for these film samples with a light box. The film samples were also used for the measurement of optical performance (whiteness, yellow index, gloss, hue and chroma).

The let down pellets were also made into plaques by compression molding. Film thicknesses were approximately 4 mils.

Example 1

RCL-9™ pigmentary rutile $TiO_2$ supplied by Millenium Inorganic Chemicals in Baltimore, Md. (2500 g) was added to a Patterson-Kelly Twin shell V-Blender and sprayed with a solution of 25 g of A-187 γ-glycidoxy propyltrimethoxysilane available from Crompton Corporation. The solution was about 20 wt. % silane in 90/10 methanol/water. The silanized $TiO_2$ (2400 g) was then dried in an oven at 140° F. (60° C.) for 8 hours.

The silanized $TiO_2$ was then compounded with 450 g of Microthene® GMN 711-20 LDPE having a MFI of 22 available from Equistar, and 150 g of ACX® 575 ethylene-maleic anhydride copolymer compatibilizer available from Allied Signal. The compounding was accomplished using a twin screw extruder model ZSK 30 by Werner & Pfleiderer. The weight ratio of treated $TiO_2$ to LDPE to compatibilizer was 80:15:5. The composition was formed into pellets and film samples were prepared using a Brabender model PL V302 single screw extruder with a 6" wide slot die.

Example 2

RCL-9 pigmentary rutile $TiO_2$ was treated with 1% γ-glycidoxy propyltrimethoxysilane and 1% L-45 polydimethylsiloxane (PDMS) available from Crompton Corporation. The $TiO_2$ was first treated with the γ-glycidoxy propyltrimethoxysilane. The PDMS (24 g) was then mixed with the silanized $TiO_2$ (2400 g), LDPE (450 g) and compatibilizer (150 g) in a Henschel mixer for about one minute at 2200 RPM as in Example 1. The dry mix was then compounded through a twin screw extruder as in Example 1.

Example 3

Example 1 was repeated using 2-(3,4-epoxycyclohexal) ethyltriethoxysilane, Y-11870, available from Crompton Corporation, instead of the γ-glycidoxypropyltrimethoxysilane.

Example 4

Example 2 was repeated using Silquest® Y-11870 2-(3, 4-epoxycyclohexal)ethyltriethoxysilane, available from Crompton Corporation, instead of the γ-glycidoxypropyltrimethoxysilane.

Comparative Example A

Untreated RCL-9 $TiO_2$ was dry mixed with Microthene GMN-711-20 LDPE (MFI 22) using a plastic bag. The mix was then fed into a twin screw extruder for compounding.

The results of the tests using Examples 1–4 and Comparative A are summarized in Table I below.

TABLE I

| Example | Torque (ft-lb) | Pressure (psi) | Dispersion | Observations during extrusion |
|---|---|---|---|---|
| 1 | 1640 | <25 | good | low feed rate but acceptable |
| 2 | 1650 | <25 | good | runs well, smooth surface |
| 3 | 1780 | <25 | good | low feed rate but acceptable |
| 4 | 1750 | 20 | excellent | runs well, smooth surface |
| Comparative A | 2600 | 400 | a film could not be made | Brittle, rough Surface, very difficult to process |

The data found in Table I demonstrates the processing advantages of using $TiO_2$ that has been treated with an organosilicone compound (Examples 1–4) as compared to an untreated $TiO_2$ (Comparative A) as opposed to using an untreated $TiO_2$ pigment (Comparative A) in a high loaded 80 wt. % $TiO_2$/polyethylene masterbatch. The torque and pressure can be used as a means of determining the relative ease with which each composition is processed through the extruder. As can be seen from the data, the comparative example with the untreated titanium dioxide requires both higher torque and higher pressure for processing the composition through the extruder.

Using the untreated $TiO_2$ lead to compounding difficulty in making a high loaded 80 wt. % $TiO_2$ masterbatch with LDPE. Films could not be made using the composition with the untreated $TiO_2$. Compounding was accomplished at a 30 wt. % level of TiO2.

The 30 wt. % loaded compositions were selected due to the incompatibility between untreated $TiO_2$ and LDPE. This incompatability resulted in difficulty in producing a masterbatch of LDPE filled with untreated $TiO_2$. Furthermore, films of LDPE highly loaded with untreated $TiO_2$ could not be successfully made. The untreated $TiO_2$ could be used to successfully produce a 30 wt. % loaded LDPE masterbatch, and films could be made thereof. Consequently, compounding experiments were conducted at a 30 wt. % loading of both treated and untreated $TiO_2$ to ensure accurate comparative results.

Comparative Example B

Untreated RCL-9 $TiO_2$ was dry mixed with Microthene® GMN 711-20 LDPE (MFI 22) at a weight ratio of 30:70 using a plastic bag. The mixture was then fed into a twin screw extruder and compounded as in Comparative Example A. The composition was formed into pellets dried. Film samples were prepared using a Brabender PL-V302 single extruder with a 6" wide slot die.

Example 5

Comparative example B was repeated except that the $TiO_2$ was treated with 1% γ-glycidoxy propyltrimethoxysilane (A-187) available from Crompton Corporation, and a compatibilizer (ACX® 575 ethylene-maleic anhydride copolymer available from Allied Signal) was added. The weight ratio of treated $TiO_2$ to LDPE to compatibilizer was 30:67:3.

Example 6

Example 5 was repeated using $TiO_2$ treated with 1% γ-glycidoxy propyltrimethoxysilane (A-187) and 1% PA-1 organomodified polydimethylsiloxane available from Crompton Corporation The weight ratio of treated $TiO_2$ to LDPE to compatibilizer was 30:67:3.

Example 7

Comparative example B was repeated using $TiO_2$ treated with 1% 2-(3,4-epoxycyclohexyl)ethyltriethoxysilane (Y-11870), and a compatibilizer (ACX 575, ethylene-maleic anhydride copolymer) was added. The weight ratio of treated $TiO_2$ to LDPE to compatibilizer was 30:67:3.

Example 8

Example 7 was repeated using $TiO_2$ treated with 1% 2-(3,4-epoxycyclohexal)ethyltriethoxysilane (Y-11870) and 1% PA-1 organomodified polydimethylsiloxane. The weight ratio of treated $TiO_2$ to LDPE to compatibilizer was 30:67:3.

The viscosity and melt flow rate of the pellets were measured using an extrusion plastometer manufactured by Tinius Olsen. The whiteness and yellowness index of the film samples were measured using a Colorgard® System 05 colormeter manufactured by Pacific Scientific. The results are summarized in Table 2 below.

TABLE II

| Example | Viscosity (Pa/sec) | Flow Rate g/10 minutes | Whiteness ASTM D 1925 | Yellowness ASTM D 1925 |
|---|---|---|---|---|
| Comparative B | 841.5 | 12.6 | 71 | 7.32 |
| 5 | 869.1 | 12.3 | 90 | 2.56 |
| 6 | 746.2 | 13.1 | 89 | 2.52 |
| 7 | 776.6 | 13.0 | 86 | 3.36 |
| 8 | 696.3 | 14.8 | 86 | 3.0 |

The data found in Table II demonstrates the improved processing parameters, lower viscosity, higher whiteness and lower yellowness achieved using the organosilicone treated $TiO_2$ pigments (Examples 5–8) versus using an untreated $TiO_2$ pigment (Comparative B) in a 30 wt. % $TiO_2$/polyethylene masterbatch. The viscosity and melt flow rate were measured using the pellets, and the whiteness and yellowness index were measured using films having a thickness of approximately 4 μm.

Comparative Example C

Comparative Example B was repeated using untreated ground $CaCO_3$. The weight ratio of untreated $CaCO_3$ and Microthene® GMN 711-20 LDPE (MFI 22) was 30:70.

Example 9

Example 6 was repeated using ground $CaCO_3$ treated with 1% γ-glycidoxy propyltrimethoxysilane (A-187) and 1% L-45 polydimethylsiloxane available from Crompton Corporation at Greenwich, Conn. The weight ratio of treated $CaCO_3$ to LDPE to compatibilizer (ACX 575) was 30:67:3.

TABLE III

| Example | Whiteness ASTM D 1925 | Yellowness ASTM D 1925 |
|---|---|---|
| Comparative C | 22 | 20.89 |
| Example 9 | 40 | 14.52 |

The data found in Table III demonstrates the higher whiteness and lower yellowness achieved using the organosilicone treated $CaCO_3$ (extended white pigment, Example 9) versus using an untreated $CaCO_3$ (Comparative Example C) in a 30 wt. % $CaCO_3$/polyethylene masterbatch.

Example 10

By weight, 20% of an epoxysilane (Silquest® A-187) treated $TiO_2$ was compounded with 2% EMAH and balance polyethylene. Material was extruded on a Brabender PL-V302 single screw extruder through a slit film die at 620° F. Evaluation of the film on a light box revealed superior integrity with no thin spots or pin-holes. Rating of material equaled 10. Lacing resistance was comparable to the industry standard Ti-Pure® R-104, available from E.I. du Pont de Nemours and Company.

Comparative Example D

By weight, 20% of an untreated $TiO_2$ pigment RCL-9 available from Millenium Chemicals, Inc. in Baltimore, Md., was compounded into balance polyethylene. Material was extruded on a Brabender PL-V302 single screw extruder through a slit film die at 620° F. The film exhibited thin spots and pin-holes under a light box. The material was rated as a 6.

Lacing occurs as a function of pigment volatility at specific wt-% pigment loadings and processing temperature. For polyethylene films pigmented with titanium dioxide, 20% wt. % $Ti_2$ in the film processed at temperature of 620° F. or greater will readily exhibit lacing of the film. Typically, materials are rated 10 if they do not lace, and below 10 if they begin to lace. Example 10 and comparative example D were compared above for lacing.

Having thus described and exemplified the invention with a certain degree of particularity, it should be appreciated that the following claims are not to be so limited but are to be afforded a scope commensurate with the wording of each element of the claim and equivalents thereof.

What is claimed is:

1. A composition comprising:
   a) a white pigment or extended white pigment surface treated with a silane having at least one functional group capable of reacting with acids and anhydrides:
   b) at least one polymeric material; and,
   c) a compatibilizer, said compatibilizer comprising copolymer of ethylene or propylene with anhydride or acid groups which are capable of reacting with the functional groups of the at least one polymeric material.

2. The composition of claim 1 wherein said silane has the following general formula:

$$R_xSi(R')_{4-x}$$

wherein

R is a nonhydrolyzable functional group directly or indirectly bonded to the silicon atom selected from the group consisting of epoxy, isocyanato, mercapto, and mixtures thereof;

R' is a hydrolyzable group selected from the group consisting of alkoxy, halogen, acetoxy or hydroxy or mixtures thereof; and x=1 to 3.

3. The composition of claim 1 wherein said pigment is $TiO_2$.

4. The composition of claim 1 wherein said extended white pigment is selected from clays, inorganic metal compounds and siliceous materials.

5. The A composition comprising:
   a) a white pigment or extended white pigment surface treated with a silane having at least one functional group capable of reacting with acids and anhydrides;
   b) at least one polymeric material; and,
   c) a compatibilizer, said compatibilizer comprising copolymer selected from the group consisting of ethylene maleic anhydride copolymers, ethylene (meth) acrylic acid copolymers, propylene maleic anhydride copolymers, propylene acrylic acid copolymers, ethylene propylene copolymers with maleic anhydride or acid functional groups, and olefinic ionomer resins.

6. The composition of claim 1 wherein said compatibilizer is present at a concentration of about 0.5 wt. % to about 20 wt. % based on a total weight of the composition.

7. The composition of claim 1 wherein said compatibilizer is present at a concentration of about 1% to about 10% by weight of the total composition.

8. The composition of claim 1 wherein said filler or pigment is present at a concentration of about 40 wt. % to about 85 wt. % based on a total weight of the composition.

9. The composition of claim 1 further comprising at least one lubricant selected from the group consisting of polysiloxanes, silicone fluids, stearates, paraffinic oils, fluorocarbon fluids, and mixtures thereof.

10. The composition of claim 9 wherein said lubricant is a polysiloxane selected from the group consisting of polydimethylsiloxane and organomodified polydimethylsiloxane.

11. The composition of claim 9 wherein said lubricant is present from about 0.5 wt. % to about to about 5 wt. % based on a total weight of the composition.

12. The composition of claim 1 wherein said silane is present on the surface of said pigment or extended white pigment in an amount of about 0.1 wt. % to about 5 wt. % based on a weight of said pigment or extended white pigment.

13. The composition of claim 1 wherein said polymeric material is selected from the group consisting of olefins and alphaolefins and their copolymers and terpolymers, rubbery block copolymers, polyamides, polyesters, vinylic polymers, acrylics, epoxies, ionomeric resins, and mixtures thereof.

14. The composition of claim 13 wherein said polymeric material is selected from the group consisting of polyethylene, ethylene copolymers, polypropylene, propylene copolymers, and mixtures thereof.

15. The composition of claim 5 wherein said silane has the following general formula:

$R_xSi(R')_{4-x}$ wherein
  R is a nonhydrolyzable functional group directly or indirectly bonded to the silicon atom selected from the group consisting of epoxy, isocyanato, mercapto, and mixtures thereof;
  R' is a hydrolyzable group selected from the group consisting of alkoxy, halogen, acetoxy or hydroxy or mixtures thereof; and
  x=1 to 3.

16. The composition of claim 5 wherein said pigment is $TiO_2$.

17. The composition of claim 5 wherein said extended white pigment is selected from clays, inorganic metal compounds and siliceous materials.

18. The composition of claim 5 wherein said extended white pigment is selected from clays, inorganic metal compounds and siliceous materials.

19. The composition of claim 5 wherein said compatibilizer is present at a concentration of about 0.5 wt. % to about 20 wt. % based on a total weight of the composition.

20. The composition of claim 5 wherein said compatibilizer is present at a concentration of about 1% to about 10% by weight of the total composition.

21. The composition of claim 5 wherein said filler or pigment is present at a concentration of about 40 wt. % to about 85 wt. % based on a total weight of the composition.

22. The composition of claim 5 further comprising at least one lubricant selected from the group consisting of polysiloxanes, silicone fluids, stearates, paraffinic oils, fluorocarbon fluids, and mixtures thereof.

23. The composition of claim 22 wherein said lubricant is a polysiloxane selected from the group consisting of polydimethylsiloxane and organomodified polydimethylsiloxane.

24. The composition of claim 22 wherein said lubricant is present from about 0.05 wt. % to about to about 5 wt. % based on a total weight of the composition.

25. The composition of claim 5 wherein said silane is present on the surface of said pigment or extended white pigment in an amount of about 0.1 wt. % to about 5 wt. % based on a weight of said pigment or extended white pigment.

26. The composition of claim 5 wherein said polymeric is selected from the group consisting of olefins and alphaolefins and their copolymers and terpolymers, rubbery block copolymers, polyamides, polyesters, vinylic polymers, acrylics, epoxies, ionomeric resins, and mixtures thereof.

27. The composition of claim 26 wherein said polymeric material is selected from the group consisting of polyethylene, ethylene copolymers, polypropylene, propylene copolymers, and mixtures thereof.

* * * * *